(12) United States Patent
Matsushima et al.

(10) Patent No.: US 7,044,652 B2
(45) Date of Patent: May 16, 2006

(54) OPTICAL TRANSMISSION MODULE

(75) Inventors: Naoki Matsushima, Yokohama (JP); Kazumi Kawamoto, Yokohama (JP); Koichiro Tonehira, Machida (JP)

(73) Assignee: OpNext Japan, Inc., Yokohama (JP)

( * ) Notice: Subject to any disclaimer, the term of this patent is extended or adjusted under 35 U.S.C. 154(b) by 323 days.

(21) Appl. No.: 10/052,626

(22) Filed: Jan. 17, 2002

(65) Prior Publication Data
US 2003/0063873 A1   Apr. 3, 2003

(30) Foreign Application Priority Data
Sep. 28, 2001   (JP)   ............................. 2001-299942

(51) Int. Cl.
G02B 6/36   (2006.01)
(52) U.S. Cl. ............................................ 385/88; 385/33
(58) Field of Classification Search .................. 385/88, 385/89, 93, 33, 34, 35, 92
See application file for complete search history.

(56) References Cited

U.S. PATENT DOCUMENTS

| | | | | |
|---|---|---|---|---|
| 4,687,285 | A | * | 8/1987 | Hily et al. ..................... 385/93 |
| 4,919,506 | A | | 4/1990 | Covey |
| 5,046,798 | A | * | 9/1991 | Yagiu et al. ................... 385/34 |
| 5,757,999 | A | * | 5/1998 | Tabuchi et al. ............... 385/93 |
| 5,857,042 | A | * | 1/1999 | Robertson et al. ............ 385/33 |
| 6,155,724 | A | * | 12/2000 | Ichino et al. .................. 385/92 |
| 6,679,635 | B1 | * | 1/2004 | Miyamoto et al. ............ 385/88 |

FOREIGN PATENT DOCUMENTS

| | | |
|---|---|---|
| CN | 2425368 | 3/2001 |
| EP | 0465230 A2 | 1/1992 |
| EP | 0590393 A1 | 4/1994 |
| EP | 0691555 A1 | 1/1996 |

OTHER PUBLICATIONS

Fischer et al. "Design and Behavior of Laser Modules for GBit/S Rates," Proceedings of the IEEE International Conference on Communications '88 (1988).
Goto "Design and Performance of a 10-Gbit/S Optical Transmitter Module," Proceedings of the IEEE-42nd Electronic Components and Technology Conference (1992).
Karstensen "High-Efficiency Two Lens Laser Diode to Single-Mode Fiber Coupler with a Silicon Plano Convex lens," Journal of Lightwave Technology 7:244-249 (1989).
Lipson et al. "Opto-mechanical considerations for laser-fiber coupling and packaging," SPIE 554:308-312 (1985).

(Continued)

*Primary Examiner*—Hwa (Andrew) Lee
(74) *Attorney, Agent, or Firm*—Townsend and Townsend and Crew LLP

(57) ABSTRACT

A semiconductor laser and an optical fiber are optically coupled via a first lens and a second lens, the second lens is previously fixed to a module package and these parts are mounted to the module package, when focal lengths of the first lens and the second lens are respectively designated by f1 and f2, an optical distance between a principal plane of the first lens on its side of the second lens and a principal plane of the second lens on its side of the first lens, is made substantially equal to f1+f2. Thereby, there is provided an optical transmission module having low price capable of achieving a high coupling efficiency with high yield.

29 Claims, 6 Drawing Sheets

OTHER PUBLICATIONS

Saruwatari et al "Efficient Diode to Single-Mode Fiber Coupling Using a Combination of Two Lenses in Confocal Condition," IEEE Journal of Quantum Electronics 17:1021-1027 (1981).

* cited by examiner

OPTICAL TRANSMISSION MODULE

FIELD OF THE INVENTION

The present invention relates to an optical transmission module used mainly in an optical transmission system or an optical exchange system (both of which are referred to as an optical transmission system).

DESCRIPTION OF THE RELATED ART

An optical coupling structure of an optical transmission module, as is seen in a publicly-known example of Japanese Patent Laid-Open No. 178986/1997 or the like, there is used an optical coupling system using two sheets of lenses for efficiently propagating optical beam having a large radiation angle from a semiconductor laser to an optical fiber having a small NA (numerical aperture), that is, a first lens having large NA for collimating the beam from the semiconductor laser and a second lens having small NA for focusing the collimated beam to an end portion of the optical fiber. As a conventional mounting system with regard to the optical coupling system, there is pointed out a so-to-speak active alignment system for making a light emitting element of semiconductor laser or the like emit light, adjusting lenses and an optical fiber at positions achieving a maximum optical coupling efficiency and fixing these parts by using YAG welding or the like.

The active alignment system can achieve a high optical coupling efficiency since respective optical parts can be mounted with high positional accuracy. On the contrary, time is taken for positioning and mounting the respective optical parts, further, there is needed a facility for actually making the semiconductor laser emit light and therefore, assembling cost is increased to thereby constitute factors of hampering low price formation and high throughput formation of the module.

As means for resolving the factors, there is proposed a method of applying a passive alignment system for carrying out visual positional adjustment with an alignment mark or the like as a measure with regard to a light emitting element and lenses and using active alignment for only an optical fiber. According to the system, an amount of positional shift between the light emitting element and the first lens 2 and an amount of positional shift between a subassembly mounted therewith and the second lens, are absorbed by carrying out active alignment only in final fiber alignment to thereby achieve high efficiency coupling and a constitution thereof and assembling steps can be expected to simplify by reducing a number of alignments by the active alignment.

However, when such a method is applied to the conventional structure, there is a possibility that a desired coupling efficiency cannot be ensured by positional shifts of optical parts. An explanation will be given of the principle in reference to schematic views shown in FIGS. 5A and 5B as follows.

FIG. 5A is a schematic view when there is not positional shift in respective parts in an optical coupling system of a conventional optical transmission module and FIG. 5B is a schematic view when positional shift is caused between a semiconductor laser and a first lens in the vertical direction. In FIG. 5A and FIG. 5B, there are used two sheets of lenses of a first lens 2 and a second lens 3. First, in the case of FIG. 5A in which positional shift is not caused between the respective parts, focused light which has passed through the second lens 3 is incident in parallel on a core of an optical fiber 4. Meanwhile, when positional shift 12 is caused in the semiconductor laser 1 as shown by FIG. 5B, inclination 13 is caused relative to an original optical axis in collimated light 11 which has passed through the first lens 2. Further, inclination 14 is caused also in focused light which has passed through the second lens 3 and a focusing position after image conversion is moved. In this case, by arranging a fiber end to the focusing position by moving the optical fiber 4 by a moving amount 15, a maximum value of the coupling efficiency can be provided. However, by only correcting the fiber, there cannot be achieved the maximum coupling efficiency when positional shift is not caused as shown by FIG. 5A.

When optical beam is assumed to be a 0-th order of gaussian beam, an efficiency η for coupling the optical beam after image conversion and the optical fiber, is represented by Equation (1) and Equation (2) as shown below when there is not caused positional shift between beam waists.

$$\eta = \kappa \exp\left\{-\kappa \frac{\pi^2 \theta^2}{2\lambda^2}(w_1^2 + w_2^2)\right\} \text{ where,} \quad (1)$$

$$\kappa = \frac{4}{\left(\frac{w_1}{w_2} + \frac{w_2}{w_1}\right)^2} \quad (2)$$

Here, notation W1 designates a spot size of light beam after image conversion, notation W2 designates a spot size of the optical fiber, notation λ designates a wavelength and notation θ designates an angle shift between the optical beam and the optical fiber. That is, it is known that even when positional shift between beam waists is corrected to null by alignment by the active alignment, in the case in which an inclination is caused in the optical beam, the coupling efficiency is lowered thereby.

FIG. 6 shows a graph plotting a correlation between a positional shift amount between the first lens 2 and the second lens 3 in a direction orthogonal to the optical axis with a shift amount between positions of the semiconductor laser 1 and the first lens 2 orthogonal to the optical axis as a parameter.

FIG. 6 is a characteristic diagram showing a coupling efficiency with regard to a positional shift between the first lens and the second lens in the optical transmission module. In the drawing, the abscissa designates the positional shift (μm) between the first and the second lenses and the ordinate designates the coupling efficiency (dB). Numeral 61 designates a characteristic curve when the positional shift between the semiconductor laser 1 and the first lens 2 is null, numeral 62 designates a characteristic curve when the positional shift between the semiconductor laser 1 and the first lens 2 is 5 μm and numeral 63 designates a characteristic curve when the positional shift between the semiconductor laser 1 and the first lens 2 is 10 μm.

Further, the characteristic curves are measured such that when a focal length of the first lens 2 is f1=0.5 mm, and a focal length of the second lens 3 is f2=1.4 mm, an optical distance d between a principal plane of the first lens 2 on a side proximate to the second lens 3 and a principal plane of the second lens 3 proximate to the first lens, is d=5.7 mm=(f1+f2)+7.6×f1.

In the drawing, according to the curve 61, the coupling efficiency is substantially maximized when the positional shift between the first and the second lenses is null, according to the curve 62, the coupling efficiency is maximized at a point at which the positional shift between the first and the second lenses is shifted to a minus side of null and according to the curve 63, the coupling efficiency is maximized at a point at which the positional shift between the first and the second lenses is shifted further, in the minus direction.

In this way, by only causing the positional shift between the first semiconductor laser 1 and the first lens 2 by about 5 μm or 10 μm, the correlation curve (curve of coupling efficiency vs lateral shift between lenses) between the positional shift amount between the first lens 2 and the second lens 3 and the coupling efficiency, is shifted to become the maximum value at which the positional shift amount is not null. The coupling efficiency of the curve 63 becomes substantially the maximum value at a position shifted in the minus direction from −70 (μm).

When the lenses are mounted by the active alignment, the position of mounting the second lens 3 can be fixed to a proper location in accordance with the inclination of the optical axis produced by the positional shift amount between the semiconductor laser 1 and the first lens 2. However, when the second lens 3 is mounted by the passive alignment method, the mounting position is not related to the positional shift amount between the semiconductor laser 1 and the first lens 2 and is to distribute centering on a certain value prescribed by the alignment mark (the position on the abscissa of FIG. 6 at which the positional shift caused between the first lens 2 and the second lens 3 is null) Therefore, accuracy of mounting the second lens, or a dispersion in mounting the second lens shows a distribution in which the positional shift amount null is made the maximum value regardless of the positional shift amount between the semiconductor laser 1 and the first lens 2. That is, even when the accuracy of mounting the first lens 2 and the second lens 3 is made as high as possible, the coupling efficiency cannot be ensured at all when there is caused the positional shift of about several μm between the first semiconductor laser 1 and the first lens 2.

SUMMARY OF THE INVENTION

It is an object of the invention to promote a transmission efficiency of an optical transmission module.

It is other object of the invention to provide an optical transmission module capable of maintaining a high transmission efficiency even in a passive alignment system.

In order to achieve the object or the invention, according to a first aspect of the invention, there is provided an optical transmission module comprising a light emitting element, an optical fiber, a first lens for collimating light from the light emitting element, and a second lens for focusing the collimated light to the optical fiber, wherein when a focal length of the first lens is designated by a notation f1 and a focal length of the second lens is designated by a notation f2, the first lens and the second lens are arranged such that an optical distance d between a principal plane of a side of the first lens proximate to the second lens and a principal plane of a side of the second lens proximate to the first lens satisfies $|d-(f1+f2)| \leq 5 \times f1$.

Further, according to a second aspect of the invention, there is provided an optical transmission module comprising a light emitting element, an optical fiber, a first lens for collimating light from the light emitting element, and a second lens for focusing the collimated light to the optical fiber, wherein when a focal length of the first lens is designated by a notation f1 and a focal length of the second lens is designated by a notation f2, the first lens and the second lens are arranged such that a principal plane of a side of the first lens proximate to the second lens and a principal plane of a side of the second lens proximate to the first lens substantially equals to f1+f2.

When the lenses under such a relationship are used, even when a positional shift is caused in the first lens or the light emitting element, the coupling efficiency can be restrained from deteriorating. Therefore, even when both of the first lens and the second lens are mounted by a passive system, the coupling efficiency is not deteriorated considerably.

In the second aspect of the invention, when the first and the second lenses are arranged such that the optical distance d satisfies $|d-(f1+f2)| \leq 5 \times f1$, preferably satisfies $|d-(f1+f2)| \leq 2 \times f1$, the coupling efficiency can further be restrained from deteriorating.

Further, in the first or the second aspect of the invention, also when the first and the second lenses are arranged such that a relationship between the focal length f1 of the first lens and the focal length f2 of the second lens becomes $f2/f1 \geq 5$, the coupling efficiency can be restrained from deteriorating.

Further, in the first or the second aspect of the invention, even when the first lens is mounted on a groove formed on a silicon board, the coupling efficiency can similarly be restrained from deteriorating.

Further, in the first or the second aspect of the invention, even when there is arranged an isolator for restraining incidence of reflected return light to the light emitting element at either of between optical axes of the first lens and the second lens, or between optical axes of the second lens and the optical fiber, similarly, the coupling efficiency can be restrained from deteriorating.

In the first or the second aspect of the invention, when the first lens and the second lens are arranged such that the relationship between the focal length f1 of the first lens and the focal length f2 of the second lens becomes $f2/f1 \geq 5$ and a laser having an output equal to or smaller than 10 mW (10 dBm) in the light emitting element, the coupling efficiency can remarkably be restrained from deteriorating. Particularly, when the invention is applied to an optical transmission module having a long distance and a large capacity such that a transmission capacitance is 2.5 Gbit/s and a transmission distance is equal to or larger than 15 km, or the transmission capacity is equal to or larger than 10 Gbit/s and the transmission distance is equal to or larger than 2 km, or an optical transmission module having a short distance and a large capacity such that the transmission capacity is equal to or larger than 10 Gbit/s and the transmission distance is equal to or smaller than 2 km, even in alignment by the passive system, the coupling loss can be restrained to practical coupling loss of about 2 dB in the former and about 3 dB in the latter.

These and other objects, features and advantages of the invention will be apparent from the following more particular description of preferred embodiments of the invention, as illustrated in the accompanying drawings.

DESCRIPTION OF THE PREFERRED EMBODIMENTS

An explanation will be given of embodiments of the invention in reference to the drawings as follows.

Figure 1:
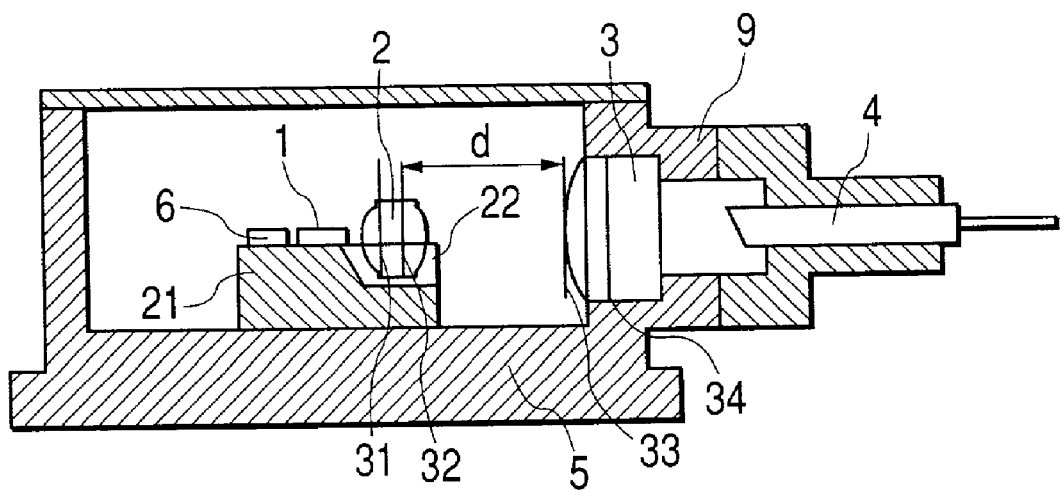
FIG. 1 is a partially sectional side view showing a first embodiment of an optical transmission module according to the invention.

FIG. 1 is a partially sectional side view showing a first embodiment of an optical transmission module according to the invention. An optical system of the embodiment is constructed by a constitution including a semiconductor laser 1, a first lens 2, a second lens 3 and an optical fiber 4. The second lens 3 is previously fixed to a module package 5 by using a bonding material such as solder or low melting point glass. In this case, the second lens 3 and the module package 5 are connected such that a bonding interface therebetween can maintain airtightness. Airtightness at inside of the module package 5 is ensured in this way and therefore, reliability of the module can be promoted. With regard to a method of fixing the second lens 3, there may be constituted a mode in which there is used a lens integrally formed with a metal cylinder 9 and the metal cylinder 9 and the module package is previously fixed by using solder or the like.

Further, an optical distance d between a principal plane 32 on a side of the first lens 2 proximate to the second lens and a principal plane 33 of the second lens 3 proximate to the first lens 2, may satisfy $|d-(f1+f2)| \leq 5 \times f1$, as mentioned later, and preferably satisfy $|d-(f1+f2)| < 2 \times f1$. According to the embodiment, an explanation will be given by taking an example of a case in which the optical distance is constituted by a sum f1+f2 of a focal length f1 of the first lens 2 and a focal length f2 of the second lens 3.

The semiconductor laser 1 is fixed onto a subassembly 21 by using a publicly-known bonding agent such as solder with an alignment mark as a reference. A photodiode 6 for monitoring an output of the semiconductor laser 1 is fixed to a rear side of the semiconductor laser 1 similarly by a publicly-known bonding agent.

The first lens 2 is mounted on a groove 22 (a groove in a V-like shape when viewed from a side of the second lens 3) provided at the subassembly 21. In this case, a member of the subassembly 21 is constituted by a silicon board and the V groove 22 is constituted by subjecting the silicon substrate to anisotropic etching. In this way, the V groove 22 is formed by anisotropic etching and therefore, the V groove can be formed with excellent accuracy. Although a method of mounting the first lens 2 may be a method other than the above-described, it is a necessary condition that the method comprises a step capable of positioning the first lens 2 with excellent accuracy in a short period of time.

The subassembly 21 mounted with these parts is fixed to a proper position of a bottom face of the module package 5 by using a publicly-known bonding agent such as solder with the position of the second lens 3 previously fixed to the module package 5 as a reference.

The optical fiber 4 is attached on a front side of the second lens 3. The semiconductor laser 1 is made to emit light, the optical fiber 4 is adjusted in XYZ axes directions to a position at which the coupling efficiency of the optical fiber becomes the highest and is fixed to the module package 5 by publicly-known bonding technology such as YAG welding.

Figure 3A:
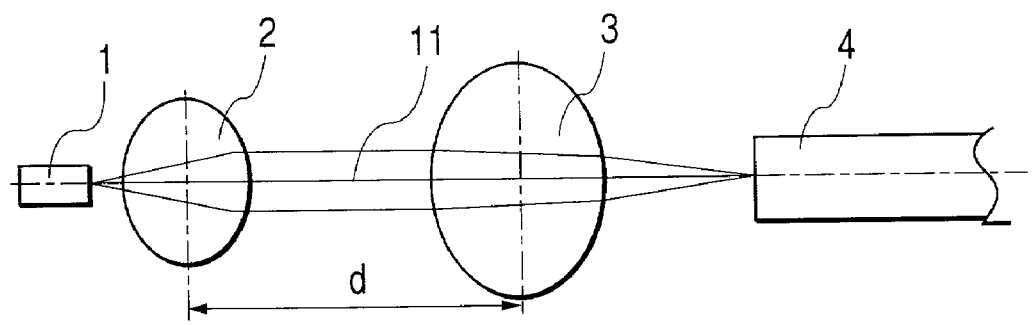
FIG. 3A is a schematic view when there is no positional shift in respective parts in coupling concept of an optical coupling system of an optical transmission module according to the invention.
Figure 3B:
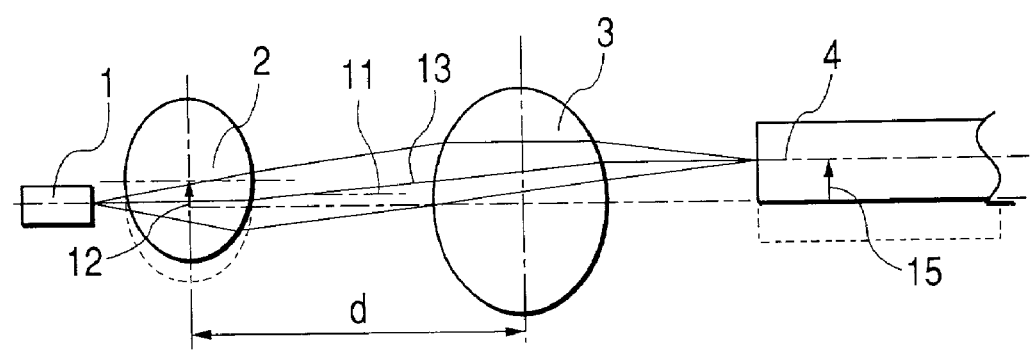
FIG. 3B is a schematic view when positional shift is caused in a vertical direction between a semiconductor laser and a first lens.

FIG. 3A is a schematic view when there is no positional shift in respective parts in an optical coupling system of an optical transmission module according to the invention and FIG. 3B is a schematic view when positional shift is caused between the semiconductor laser and the first lens 2 in a vertical direction.

As shown by FIG. 3A, when there is no positional shift in respective parts, the maximum coupling efficiency is achieved. When the positional shift is caused between the semiconductor laser 1 and the first lens 2 in a direction orthogonal to an optical axis as shown by FIG. 3B, an inclination is produced in the beam relative to an original optical axis similar to FIG. 5B. The inclined collimated beam is incident on the second lens 3 and at this occasion, by arranging the first lens 2 and the second lens 3 as described above, for example, such that d become f1+f2, focused light which has transmitted through the second lens 3 becomes in parallel with the original optical axis. When the optical fiber 4 is fixed to beam waist by active alignment, the inclination of the optical axis caused by the positional shift between the semiconductor laser 1 and the first lens 2 can substantially be cancelled.

Figure 4:
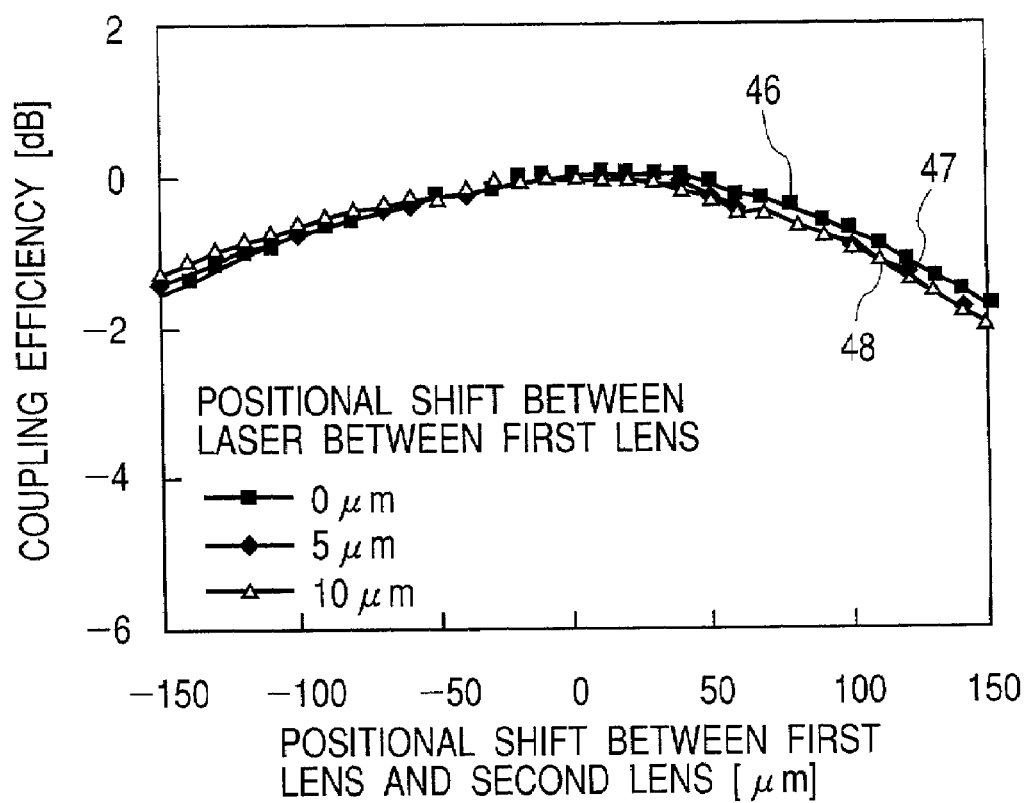
FIG. 4 is a characteristic diagram showing a coupling efficiency with regard to positional shift between a first lens and a second lens in an optical transmission module.

FIG. 4 is a characteristic diagram showing the coupling efficiency with regard to the positional shift between the first lens and the second lens in the optical transmission module. In the drawing, the abscissa designates positional shift (μm) between the first and the second lenses, the ordinate designates the coupling efficiency (dB) and a correlation between the positional shift amount in the vertical direction between the optical axes of the first lens 2 and the second lens 3 and the coupling efficiency, is plotted with the shift amount between positions of the semiconductor laser 1 and the first lens 2 orthogonal to the optical axes, as a parameter.

In the drawing, numeral 46 designates a characteristic curve when the positional shift between the semiconductor laser 1 and the first lens 2 is null, numeral 47 designates a characteristic curve when the positional shift between the semiconductor laser 1 and the first lens 2 is 5 μm and numeral 48 designates a characteristic curve when the positional shift between the semiconductor laser 1 and the first lens 2 is 10 μm and these curves substantially overlap each other and can hardly be discriminated from each other.

In the drawing, when the focal length of the first lens 2 is set to f1=0.5 mm and the focal length of the second lens 3 is set to f2=4 mm, the optical distance d between the principal plane of the first lens 2 on the side proximate to the second lens and the principal plane of the second lens 3 on the side proximate to the first lens, is set to d=4.7 mm=(f1+f2)+0.4×f1. It is known from the characteristic curves 46 through 48 that even when the positional shift is caused between the semiconductor laser 1 and the first lens 2, there is hardly produced a phenomenon that the curve of the coupling efficiency vs the positional shift amount between the first lens 2 and the second lens 3, is shifted.

Figure 5A:
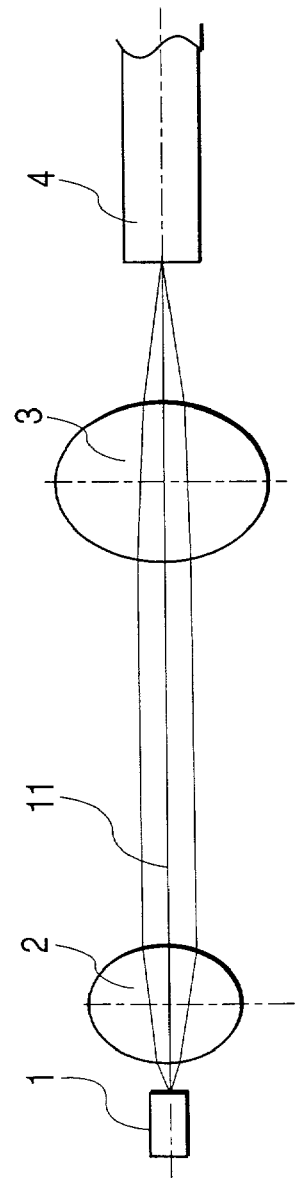
FIG. 5A is a schematic view when there is no positional shift in respective parts in an optical coupling system of a conventional optical transmission module and FIG. 5B is a schematic view when positional shift is caused in a vertical direction between a semiconductor laser and a first lens.
Figure 5B:
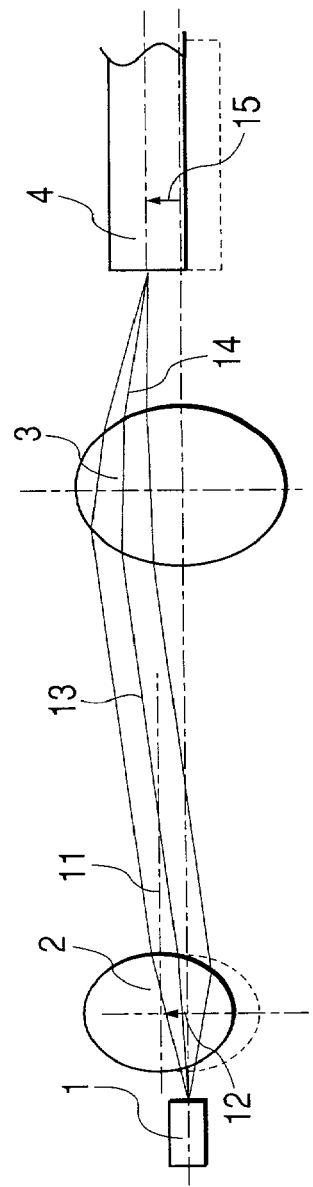
Figure 6:
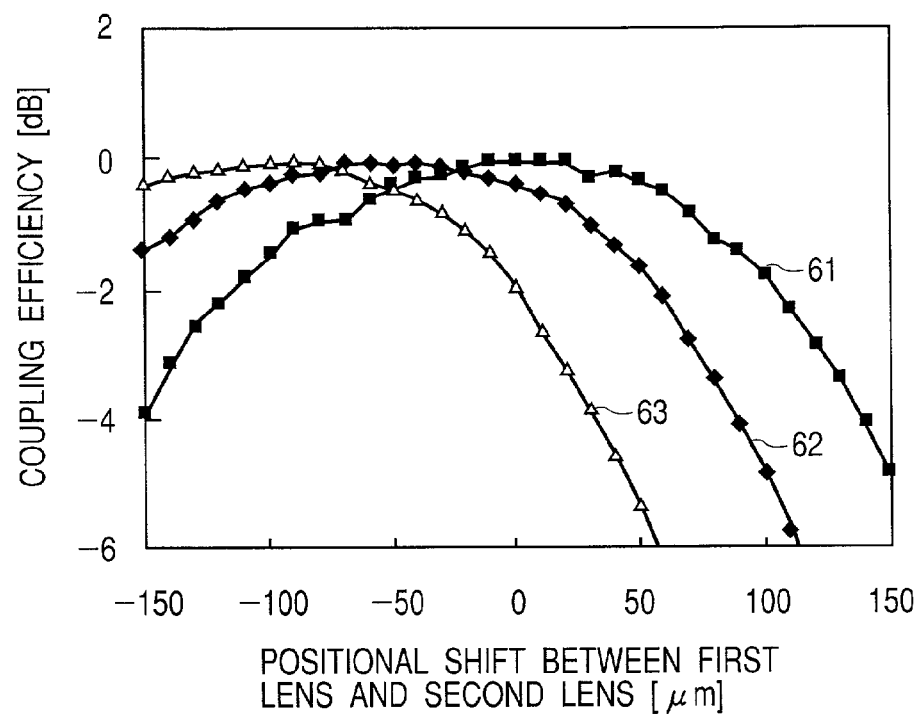
FIG. 6 is a characteristic diagram showing a coupling efficiency with regard to positional shift between a first lens and a second lens in an optical transmission module.

According to the characteristic curve of FIG. 6 with regard to the optical coupling system of FIGS. 5A and 5B, there is caused the shift in the curve of the coupling efficiency vs the later shift between the lenses and the optical distance d in this case becomes d=5.7 mm=(f1+f2)+7.6×f1 (f1=0.5 mm, f2=1.4 mm). As described above, according to the embodiment, there causes no shift in the curve of the coupling efficiency vs the lateral shift between the lenses caused by the positional shift between the semiconductor laser 1 and the first lens 2 and therefore, the embodiment becomes particularly advantageous when the lenses are mounted by the passive alignment. That is, when the position of mounting the second lens 3, is disposed at the position prescribed by the alignment mark, the excellent coupling efficiency can be achieved.

Further, although according to the embodiment, the optical distance d is set as d=f1+f2 (however, in FIG. 4, d=(f1+f2)+0.4f1), a distance d other than the above-specified may be used so far as inequality $|d-(f1+f2)| \leq 2 \times f1$ is satisfied.

Figure 7:
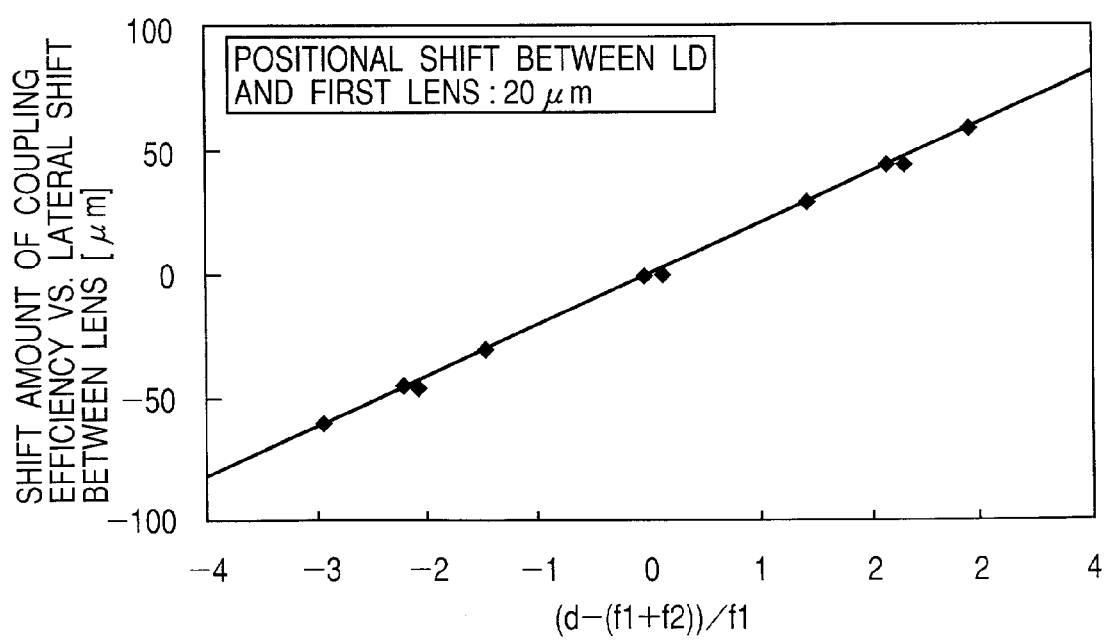
FIG. 7 is a characteristic diagram showing a shift amount of a curve of coupling efficiency vs lateral shift between lenses with regard to a distance between lenses and focal distances of the lenses.

FIG. 7 is a characteristic diagram showing a shift amount of the curve of the coupling efficiency vs the lateral shift between lenses with regard to the distance between the lenses and the focal lengths of the lenses, showing a correlation between the optical distance d between the lenses, and the shift amount of the curve of the coupling efficiency vs the lateral shift between the lenses by the positional shift between the first lens 2 and the second lens 3 when the positional shift is caused between the semiconductor laser 1 and the first lens 2 by 20 μm. The abscissa designates (d−(f1+f2))/f1 and the ordinate designates the tolerance shift amount (μm).

There is caused a mounting dispersion of about 20 μm at maximum in the semiconductor laser 1and the first lens 2 generally by a dispersion in a height of the semiconductor laser chip and a dispersion in a height of a bonding agent such as solder. When an index of (d−(f1+f2))/f1 is used, general normalizing can be carried out without depending on absolute values of f1 and f2. In the drawing, when $-2 \leq (d-(f1+f2))/f1 \leq 2$, that is, when $|d-(f1+f2)| \leq 2 \times f1$, the shift amount of the curve in the coupling efficiency vs the lateral shift between the lenses in the case of causing the positional shift of 20 μm between the semiconductor laser 1 and the first lens 2, can be restrained to be equal to or smaller than 50 μm.

Consider here a case in which the embodiment is applied to an optical transmission module used in optical communication of large transmission capacity and long distance transmission such that a transmission capacity is 2.5 Gbit/s, a transmission distance is equal to or larger than 15 km, or the transmission capacitance is equal to or larger than 10 Gbit/s and the transmission distance is equal to or larger than 2 km. When optical communication is carried out as described above, in order to clear a predetermined code error rate, there is used DFBLD (Distributed Feedback Laser Diode) laser constituting a single vertical mode laser in a semiconductor laser of the optical transmission module. Further, it is desired that an optical output of the optical transmission module is equal to or larger than 1 mW (0 dBm). An upper limit of the output of the DFB laser is about 10 mW (10 dBm) and when ageing deterioration of the optical transmission module is taken into consideration, coupling loss from the laser beam to the optical fiber needs to be restrained to about 5 dB. When the maximum coupling efficiency and isolator transmission loss are subtracted from the coupling loss, allocation permitted to a positional shift in mounting an optical part is estimated to be about 2 dB. When the second lens 3 is fixed to the module package, according to the conventional fabrication method, positional accuracy of the optical axis of the second lens 3 relative to the module package becomes about ±100 μm. The positional dispersion in the second lens 3 corresponds to a dispersion in positions of mounting the first lens 2 and the second lens 3 in the optical coupling system. Therefore, in the optical transmission module previously fixed with the second lens 3 to the module package, a positional shift amount of the second lens 3 of ±100 μm needs to be permitted.

Consider here of the optical coupling structure of the optical transmission module satisfying the above-described positional shift.

Figure 8:
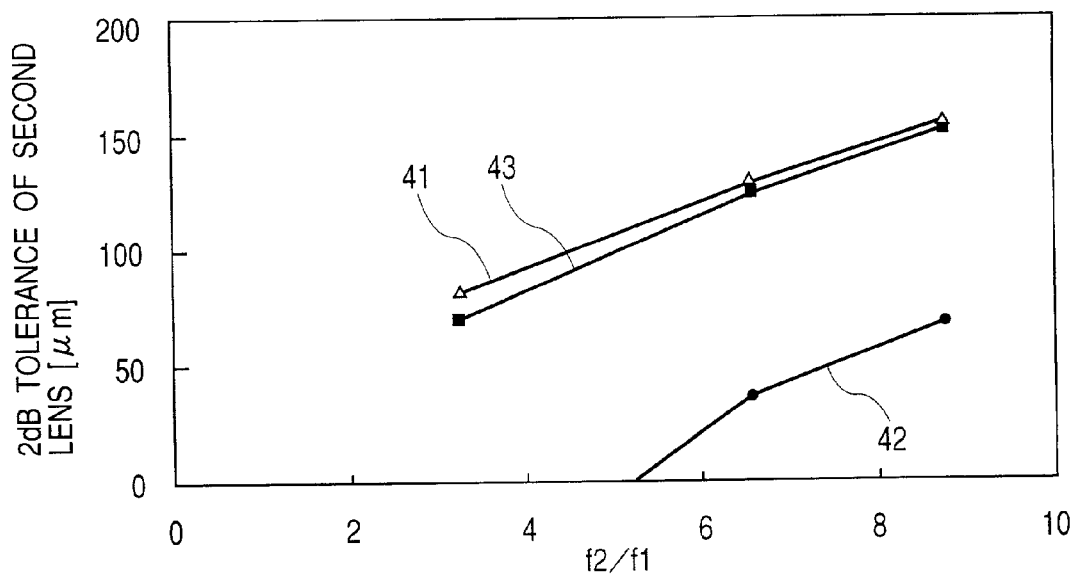
FIG. 8 is a characteristic diagram showing a tolerance when a second lens with regard to a focal length of the lens is lowered by 2 dB.

FIG. 8 is a characteristic diagram showing a tolerance when the second lens is lowered by 2 dB with regard to the focal distance of the lens, the abscissa designates a radio of f2/f1 of the focal length of the second lens to the focal length of the first lens and the ordinate designates 2 dB tolerance of the positional shift amount of the second lens. The characteristic diagram shows that by how much the second lens 3 is shifted relative to the first lens 2, an output of the second lens 3 is lowered by 20 dB and is on the premise that the second lens 3 is shifted relative to the first lens 2 by about 100 μm. In the drawing, a curve 41 shows a value when there is no positional shift between the semiconductor laser 1 and the first lens 2. In view of the curve, the larger the ratio f2/f1 of the focal lengths, the wider the tolerance and in order to satisfy ±100 μm of 2 dB tolerance, it is generally necessary that f2/f1≧4.5. Meanwhile, a curve 42 shows a value when there is caused a positional shift of 20 μm between the semiconductor laser 1 and the first lens 2 and 2 dB tolerance of ±100 μm is satisfied when f2/f2 is equal to or larger than 5. Further, a curve 42 shows a case of |d−(f1+f2)|=7×f1 constituting an optical coupling system outside of the range of the invention. As is apparent by viewing the drawing, in the case of the curve 42, the positional shift tolerance is narrowed and when the ratio of the focal lengths is equal to or smaller than 10, there is no solution satisfying 2 dB or smaller.

When the optical distance d between the first lens 2 and the second lens 3 satisfies d=f1+f2, that is, in the case of the optical coupling system according to the invention, even when the positional shift is caused between the semiconductor laser 1 and the first lens 2, the value of the tolerance is not varied considerably from the curve 41. A curve 43 shows a case in which there is a positional shift of 20 μm between the semiconductor laser 1 and the first lens 2 and d satisfies |d−(f1+f2)|=0.5×f1. A value of f2/f1 in the tolerance of 100 μm of the second lens 3 is 0.5. Therefore, when there is satisfied f2/f1≧0.45, preferably f2/f1≧0.5, even when the positional shift is caused between the semiconductor laser 1 and the first lens 2 by 20 μm, 2 dB tolerance of ±100 μm is satisfied.

Next, consider an optical transmission module used in large transmission capacity and short distance transmission in which the transmission capacity is equal to or larger than 10 Gbit/s and the transmission distance is about 500 m. When the transmission distance is short, influence of waveform deterioration by dispersion, chirping or the like becomes more inconsiderable than in a long distance transmission module. Therefore, a tolerance value of coupling loss is more or less alleviated than the above-described and an allocation permitted to positional shift of coupling becomes about 3 dB.

Figure 9:
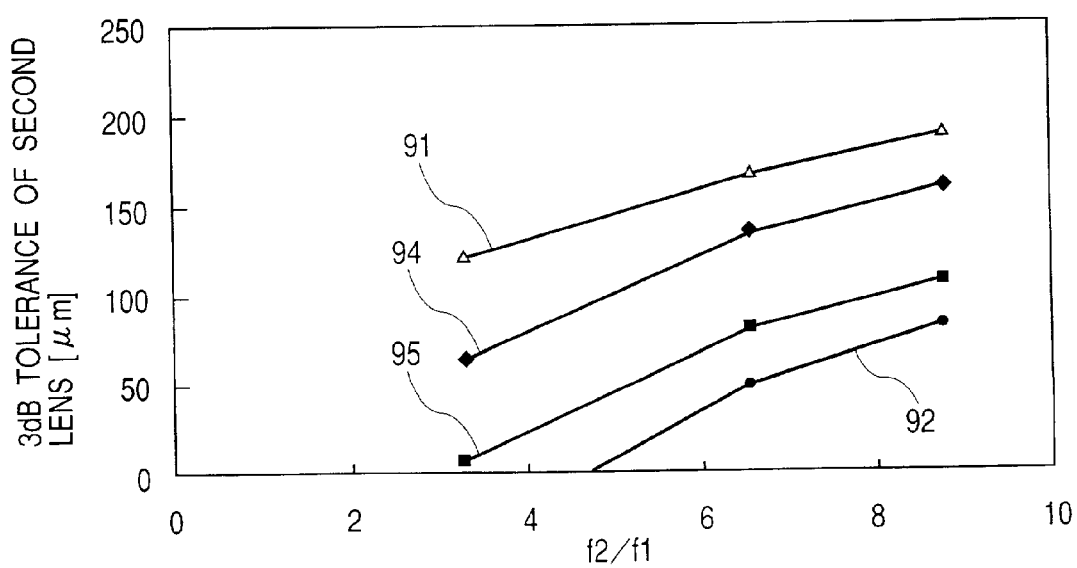
FIG. 9 is a characteristic diagram showing a tolerance when a second lens with regard to a focal length of the lens is lowered by 3 dB.

FIG. 9 is a characteristic diagram showing a tolerance when the second lens with respect to the focal distance of the lens is lowered by 3 dB, the abscissa designates the radio f2/f1 of the focal lens of the second lens to the focal length to the first lens and the ordinate designates 2 dB tolerance of the positional shift amount of the second lens. Although FIG. 9 is a graph showing the ratio of the focal lengths versus the tolerance of the second lens 3 similar to FIG. 8, a difference therebetween resides in that the ordinate designates 3 dB tolerance. A curve 91 shows a value when there is no positional shift between the semiconductor laser 1 and the first lens 2, a curve 92 shows a value when the positional shift of 20 μm is caused between the semiconductor laser 1 and the first lens 2 and d is $|d-(f1+f2)|=7 \times f1$, a curve 94 shows a value when there is the positional shift of 20 μm between the semiconductor laser 1 and the first lens 2 and d satisfies $|d-(f1+f2)|=2 \times f1$ and a curve 95 shows a value when there is the operational shift of 20 μm between the semiconductor laser 1 and the first lens 2 and d satisfies $|d-(f1+f2)|=5 \times f1$. As show by the drawing, under the condition of the curve 94, when $f2/f1 \geq 5$ is substantially satisfied, even when the positional shift of 20 μm is caused between the semiconductor laser 1 and the first lens 2, 3 dB tolerance ±100 μm is satisfied. Further, under the condition of curve 95, when $f2/f1 \geq 8$ is substantially satisfied, even when the positional shift of 20 μm is caused between the semiconductor laser 1 and the first lens 2, 3 dB tolerance ±100 μm is satisfied.

According to the optical transmission module of the embodiment described above, even when the positional shift is caused between the semiconductor laser 1 and the first lens 2, as shown by FIG. 4, shift of the tolerance curve can be restrained from causing and the optical transmission module having excellent optical coupling efficiency can be provided with excellent yield at low price.

Next, an explanation will be given of a second embodiment of the invention in reference to FIG. 2.

Figure 2:
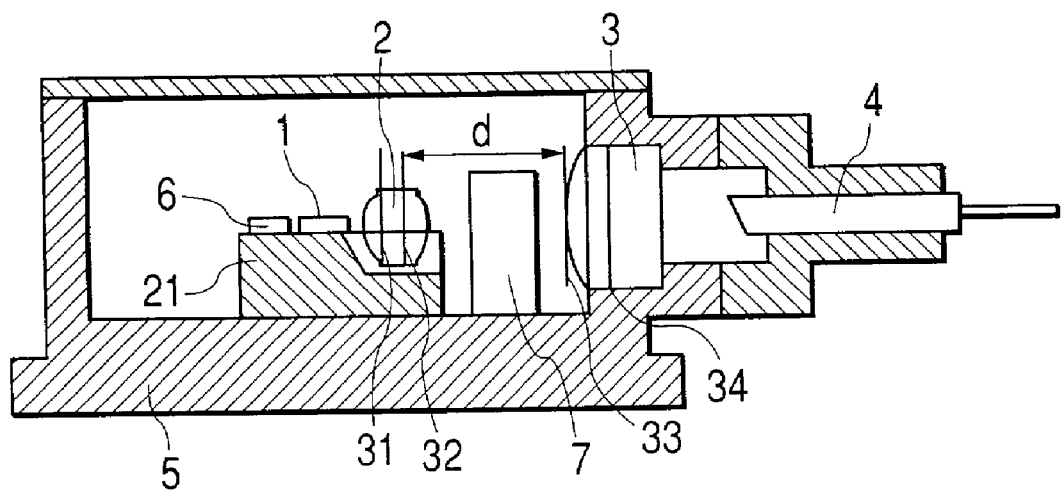
FIG. 2 is a partially sectional side view showing a second embodiment of an optical transmission module according to the invention.

FIG. 2 is a partially sectional side view showing a second embodiment of an optical transmission module according to the invention. Also in the embodiment of FIG. 2, the second lens 3 is previously fixed to the module package 5, further, the optical distance d between the principal plane 32 of the first lens 2 on the side proximate to the second lens 3 and the principal plane 33 of the second lens 3 on the side proximate to the first lens 2, is set as $d=f1+f2$.

A difference of the embodiment shown in FIG. 2 from the embodiment of FIG. 1 resides in that an optical isolator 7 for restraining incidence of reflected return light to the semiconductor laser 1 is provided between the first lens 2 and the second lens 3. Although in FIG. 1, the optical distance d can be regarded to be the same as the physical distance d since nothing is present between the first lens 2 and the second lens 3, in the case of FIG. 2, a physical arrangement needs to determine in consideration of a refractive index of a member constituting the optical isolator 7. The optical isolator 7 is normally constituted by a polarizer, a Farady rotor and an analyzer, and when a refractive index of a certain member among them is designates by notation n1 and a thickness thereof is designated by notation d1, an optical thickness d1o thereof becomes $d1o=d1 \times n0/n1$ (n0: a refractive index of a space, normally, a refractive index of air n0=1). Also with regard to other member, the physical distance is determined such that the optical distance d satisfies $d=f1+f2$ by making a similar consideration.

A system of fixing the second lens 3 according to the embodiment may be the system described in the embodiment of FIG. 1. Further, also the range of the optical distance d is similar to that in the embodiment of FIG. 1 and preferably, the range is constituted to satisfy $|d-(f1+f2)|=2 \times f1$.

According to the optical transmission module having such a mode, similar to the embodiment of FIG. 1, even when positional shift is caused between the semiconductor laser 1 and the first lens 2, as shown by FIG. 4, the tolerance curve can be restrained from causing the shift and the optical transmission module having excellent optical coupling efficiency can be provided with excellent yield at low price.

According to the embodiment, a failure in the coupling efficiency can be restrained from causing and therefore, the optical transmission module having low price and high coupling efficiency can be provided with high yield.

The invention may be embodied in other specific forms without departing from the spirit or essential characteristics thereof. The present embodiment is therefore to be considered in all respects as illustrative and not restrictive, the scope of the invention being indicated by the appended rather than by the foregoing description and all changes which come within the meaning and range of equivalency of the claims are therefore intended to be embraced therein.

What is claimed is:

1. An optical transmission module comprising:
   a light emitting element;
   an optical fiber;
   a first lens for collimating light from the light emitting element;
   a second lens for focusing said collimated light to said optical fiber;
   a package to which the second lens is fixed to maintain airtightness at an inside of the package; and
   a subassembly on which the light emitting element and the first lens are mounted, the subassembly being disposed in the inside of the package to be fixed to a bottom face of the package;
   wherein when a focal length of said first lens is designated by a notation f1 and a focal length of said second lens is designated by a notation f2, said first lens and said second lens are arranged such that an optical distance d between a principal plane of a side of said first lens proximate to said second lens and a principal plane of a side of said second lens proximate to said first lens satisfies $|d-(f1+f2)| \leq 5 \times f1$; and
   wherein said first lens and said second lens are arranged such that a relationship between said focal length f1 of said first lens and said focal length f2 of said second lens becomes $f2/f1 \leq 5$.

2. The optical transmission module according to claim 1, wherein said first lens has a structure adjusted on the subassembly by a passive alignment system.

3. The optical transmission module according to claim 1, wherein the subassembly is made of a silicon board, and said first lens is mounted on a groove formed on the silicon board.

4. The optical transmission module according to claim 1, wherein an isolator for restraining incidence of reflected return light to said light emitting element is arranged at either of between optical axes of said first lens and said second lens and between optical axes of said second lens and said optical fiber.

5. The optical transmission module according to claim 1, wherein an isolator for restraining incidence of reflected return light to said light emitting element is arranged at either of between optical axes of said first lens and said second lens and between optical axes of said second lens and said optical fiber.

6. The optical transmission module according to claim 1, wherein said light emitting element is a laser having an output equal to or smaller than 10 mW (10 dBm).

7. The optical transmission module according to claim 6, wherein said optical module is connected to an optical fiber network having a transmission capacitance of 2.5 Gbit/s and a transmission distance equal to or larger than 15 km, or a transmission capacitance equal to or larger than 10 Gbit/s and a transmission distance equal to or larger than 2 km.

8. The optical transmission module according to claim 6, wherein said optical module is connected to an optical fiber network having a transmission capacitance equal to or larger than 10 Gbit/s and a transmission distance equal to or smaller than 2 km.

9. The optical transmission module according to claim 1, wherein an optical axis of the first lens is shifted from an optical axis of the second lens in a direction orthogonal to the optical axis of the first lens with respect to the bottom face of the package; and wherein an optical coupling loss between the first lens and the second lens is less than 2dB.

10. The optical transmission module according to claim 9, wherein a positional shift of the optical axis of the first lens from the optical axis of the second lens in the direction orthogonal to the optical axis of the first lens with respect to the bottom face of the package is within 100 μm.

11. The optical transmission module according to claim 9, wherein a light emitting position of the light emitting element is shifted from the optical axis of the first lens in the direction orthogonal to the optical axis of the first lens with respect to the bottom face of the package within 20 μm.

12. The optical transmission module according to claim 1, wherein the light emitting element is fixed to the subassembly by a bonding agent.

13. The optical transmission module according to claim 12, wherein the bonding agent comprises a solder.

14. The optical transmission module according to claim 1, wherein the subassembly is fixed to the bottom face of the package by a bonding agent with a position of the second lens previously fixed to the package.

15. The optical transmission module according to claim 14, wherein the bonding agent comprises a solder.

16. The optical transmission module according to claim 1, wherein the first lens and the second lens are arranged such that a relationship between the focal length f1 and the total length f2 becomes $f2/f1 \leq 8$.

17. An optical transmission module comprising:
a light emitting element;
an optical fiber;
a first lens for collimating light from said light emitting element;
a second lens for focusing said collimated light to said optical fiber;
a package to which the second lens is fixed to maintain airtightness at an inside of the package; and
a subassembly on which the light emitting element and the first lens are mounted, the subassembly being disposed in the inside of the package to be fixed to a bottom face of the package;

wherein when a focal length of said first lens is designated by a notation f1 and a focal length of said second lens is designated by a notation f2, said first lens and said second lens are arranged such that an optical distance between a principal plane of a side of said first lens proximate to said second lens and a principal plane of a side of said second lens proximate to said first lens substantially equals to f1+f2.

wherein said first lens and said second lens are arranged such that a relationship between said focal length f1 of said first lens and said focal length f2 of said second lens becomes $f2/f1 \leq 5$.

18. The optical transmission module according to claim 17, wherein said first lens and said second lens are arranged such that said optical distance d satisfies $|d-(f1+f2)| \leq 2 \times f1$.

19. The optical transmission module according to claim 17, wherein said first lens has a structure adjusted on the subassembly by a passive alignment system.

20. The optical transmission module according to claim 17, wherein the subassembly is made of a silicon board, and said first lens is mounted on a groove formed on the silicon board.

21. The optical transmission module according to claim 17, wherein said light emitting element is a laser having an output equal to or smaller than 10 mW (10 dBm).

22. The optical transmission module according to claim 21, wherein said optical module is connected to an optical fiber network having a transmission capacitance of 2.5 Gbit/s and a transmission distance equal to or larger than 15 km, or a transmission capacitance equal to or larger than 10 Gbit/s and a transmission distance equal to or larger than 2 km.

23. The optical transmission module according to claim 21, wherein said optical module is connected to an optical fiber network having a transmission capacitance equal to or larger than 10 Gbit/s and a transmission distance equal to or smaller than 2 km.

24. The optical transmission module according to claim 17, wherein an optical axis of the first lens is shifted from an optical axis of the second lens in a direction orthogonal to the optical axis of the first lens with respect to the bottom face of the package; and wherein an optical coupling loss between the first lens and the second lens is less than 2dB.

25. The optical transmission module according to claim 24, wherein a positional shift of the optical axis of the first lens from the optical axis of the second lens in the direction orthogonal to the optical axis of the firs lens with respect to the bottom face of the package is within 100 μm.

26. The optical transmission module according to claim 24, wherein a light emitting position of the light emitting element is shifted from the optical axis of the first lens in the direction orthogonal to the optical axis of the first lens with respect to the bottom face of the package within 20 μm.

27. The optical transmission module according to claim 17,
wherein the light emitting element is fixed to the subassembly by a bonding agent.

28. The optical transmission module according to claim 17,
wherein the subassembly is fixed to the bottom face of the package by a bonding agent with a position of the second lens previously fixed to the package.

29. The optical transmission module according to claim 17,
wherein the first lens and the second lens are arranged such that a relationship between the focal length f1 and the focal length f2 becomes $f2/f1 \leqq 8$.

* * * * *